US005441176A

United States Patent [19]

[11] Patent Number: 5,441,176

Aueé

[45] Date of Patent: Aug. 15, 1995

[54] VOLUMETRIC DRY MEASURE APPARATUS

[76] Inventor: Paul Aueé, Voltastraat 28, 3817 KN Amersfoort, Netherlands

[21] Appl. No.: 200,775

[22] Filed: Feb. 22, 1994

[51] Int. Cl.[6] .............................................. G01F 11/28

[52] U.S. Cl. .................................. 222/163; 222/168; 222/290; 222/333; 222/40

[58] Field of Search ............... 222/163, 168, 410, 342, 222/333, 290, 408, 282

[56] References Cited

U.S. PATENT DOCUMENTS

| | | | |
|---|---|---|---|
| 1,243,631 | 10/1917 | Ropp | 222/290 X |
| 1,960,522 | 5/1934 | Alexovitz | 222/408 X |
| 1,993,249 | 3/1935 | Scholz | 222/163 |
| 2,392,231 | 1/1946 | Cooper | 222/290 |
| 2,775,371 | 12/1956 | Isserlis | 222/168 |
| 2,896,824 | 7/1959 | Sheldon | 222/168 |
| 3,279,655 | 10/1966 | Isserlis | 222/168 |

*Primary Examiner*—Andres Kashnikow

*Assistant Examiner*—Lisa Douglas

*Attorney, Agent, or Firm*—Mark C. Jacobs

[57] ABSTRACT

A volumetric measuring and dispensing apparatus for the dry measure of particulate matter such as sand, or gravel, which apparatus includes one of either (I.) a rotary table spaced slightly from a body having a stationary interrupted circular wall which defines a storage zone; or (II.) a stationary table spaced slightly from a rotating body having an interrupted circular wall which defines a storage zone. The storage zone includes a distally located gate, under which a predetermined amount of particulates can pass as one of the table or said body rotates relative to the other. The apparatus also includes a retention zone on the table outside of the gate for residual material. The particulates fall into a collection vessel such as a hopper or conveying belt. The contents of the storage zone may be replenished from a conventional feed hopper or manually.

19 Claims, 7 Drawing Sheets

FIG. 4
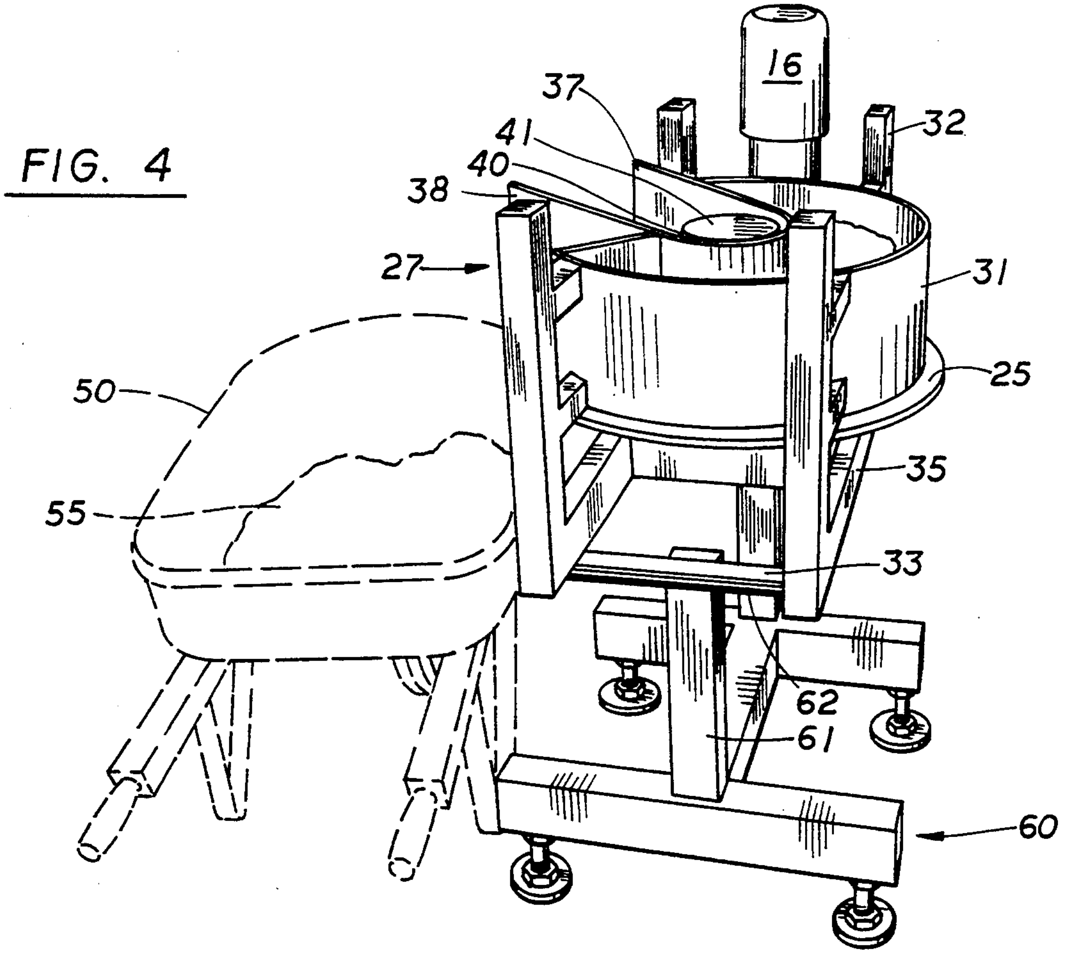
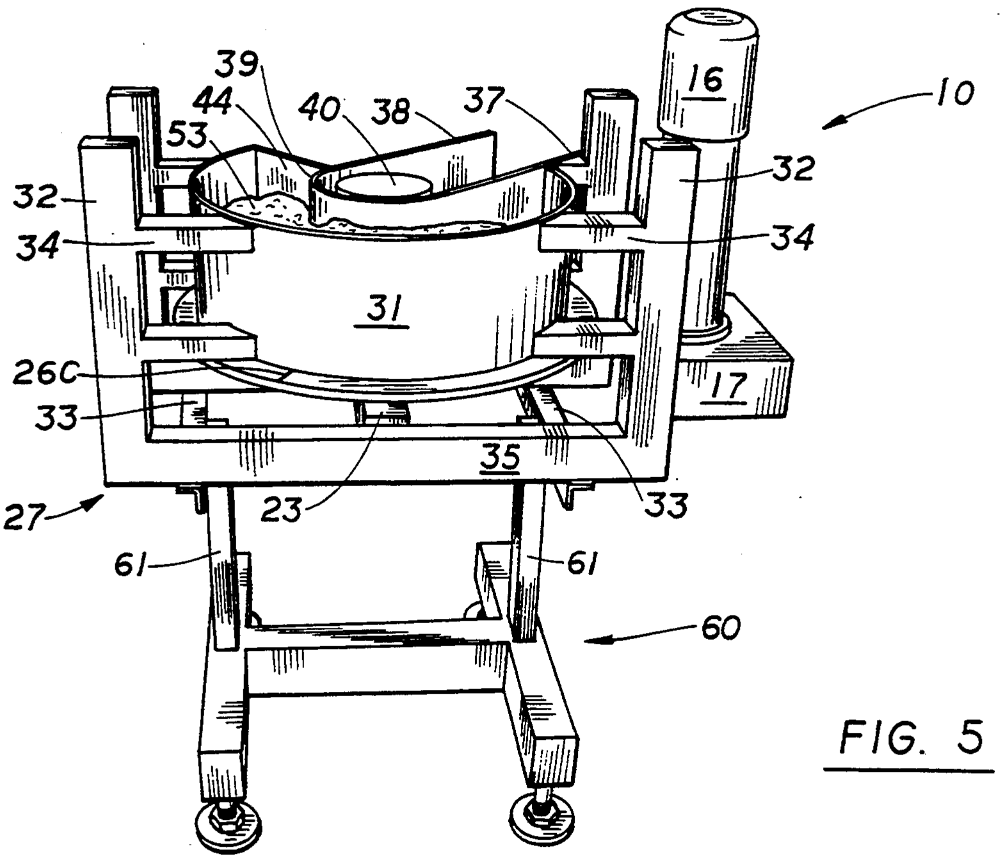
FIG. 5

VOLUMETRIC DRY MEASURE APPARATUS

BACKGROUND OF THE INVENTION

In industries such as the concrete, building block, precast brick making and others there is a need for reasonably precise dry volumetric measure of various components used in the manufacture of the products of the industry. The most commonly employed means of volumetric dry measure in use today, is a system in which the raw materials drop from a hopper through an orifice of known dimensions onto a moving endless belt. This belt is moving at a predetermined rate of speed. By counting the revolutions of the belt at the particular speed of the belt, or by determining the time of running of the belt and given the orifice opening size, one can calculate the volume of material being delivered from the belt. Typical units of these types are manufactured in Germany, and the United States, and one is shown in the prior art FIG. 8.

While considered state-of-the-art, such devices are quite costly and are therefore not available to most smaller manufacturers. There is a need therefore for a low cost precise means for making dry volumetric measurements.

It is an object therefore to provide a new apparatus for the measurement volumetrically of dry free flowing materials.

It is another object to provide a dry volumetric measuring apparatus that can be moved from location to location at the facility where it is employed.

It is a further object to provide a volumetric measuring apparatus that is relatively low in cost of purchase and cost of maintenance, yet is precise in its measurements.

A still further object is to provide a measuring apparatus which employs a refillable rotating table from which a known quantity of material can be transferred to a material receiver.

An additional object is to provide a dry measure apparatus that employs either a rotary plate with a fixed housing or a rotating housing with a fixed base plate.

Yet another object is to provide a dry measuring apparatus that is easy to operate, and has few moving parts.

Other objects of the invention will in part be obvious and will in part appear hereinafter.

The invention accordingly comprises the apparatus possessing the features properties and the relation of components which are exemplified in the following detailed disclosure and the scope of the application of which will be indicated in the appended claims.

For a fuller understanding of the nature and objects of the invention reference should be made to the following detailed description, taken in conjunction with the accompanying drawings.

SUMMARY OF THE INVENTION

A volumetric measuring and dispensing apparatus for the dry measure of particulate matter such as sand, or gravel, which apparatus includes a rotary table—often also referred to as a rotating disk—with a stationary interrupted circular wall which defines a storage zone. The storage zone includes a distally located gate, under which a predetermined amount of particulates can pass as the table rotates. The particulates fall from the apparatus into a collection vessel such as a conveyor belt, mixer or holding hopper, due to being forced from the rotating surface by a vertical plate spaced above the rotating surface which acts as a gate. The material impacts the plate which stops the rotation of the material and forces it out of the space off the rotating surface.

BRIEF DESCRIPTION OF THE FIGURES

FIG. 4 is a left rear perspective view thereof,

FIG. 5 is a left side perspective view of this apparatus.

DESCRIPTION OF THE PREFERRED EMBODIMENT

Figure 2:
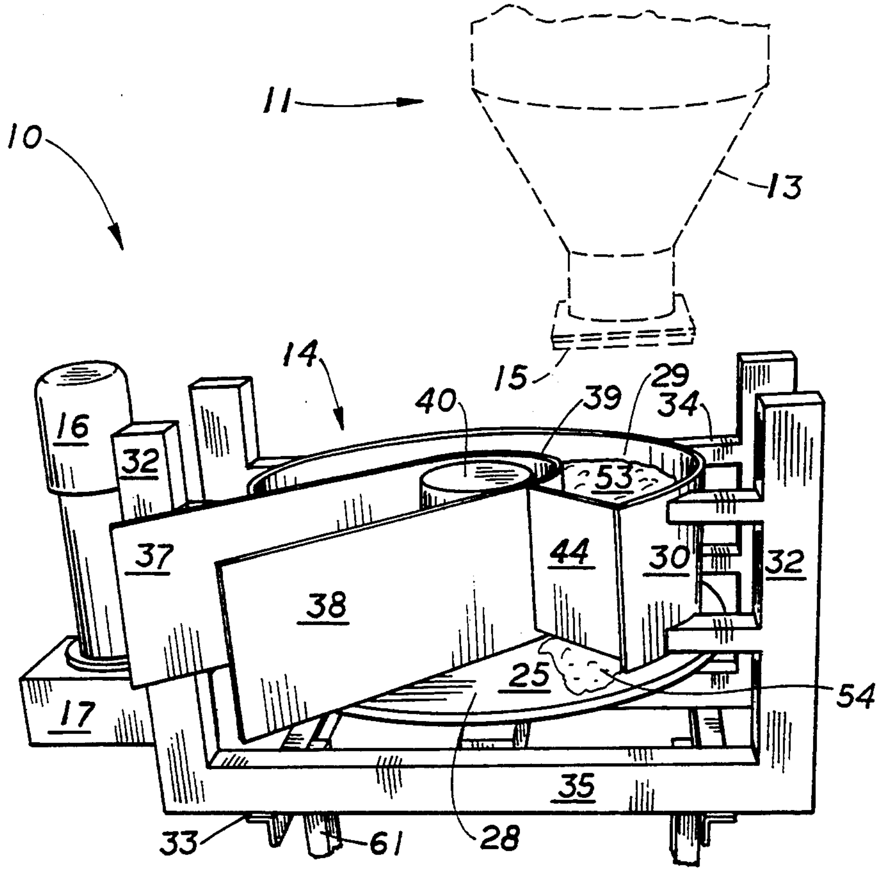
FIG. 2 is a right elevational view of the apparatus of this invention.

The apparatus of this invention 10, is best seen in FIG. 2 mounted on a stand 27. See FIG. 4. The apparatus is used in conjunction with hopper 11 which has a body 13 with a releasable gate 15 at the bottom end thereof. Such hoppers 11 are deemed conventional in the material handling field. The gate-release 15 may be of the type that pivots downwardly, such as in a railroad hopper car, or one which moves laterally to permit product in the hopper body 13 to drop therefrom.

This apparatus in its first embodiment, comprises a fixed body and a movable base, and a stand. In its second embodiment, the apparatus features a rotating body and a fixed base. The first embodiment is best illustrated by reference to FIG. 6. Motor 16 having a shaft 18 with a toothed drive gear 18G thereon is connected by sprocket chain 20 to a second toothed gear 21. Second toothed gear 21 is disposed upon a rotatable upstanding shaft 22 disposed within a spindle mount 23.

The movable base of this apparatus comprises a rotatable plate disposed upon a support. The mounting space plate 24, is interposed between and connected to both said second toothed gear 21, and the underside of a rotary plate 25 such that, upon actuation of said motors, the chain in engagement with the two toothed gears causes the rotary plate to revolve. The indicia 26A and 26B (see FIG. 3) serve as 90° indicators to help one to count the rotations of the rotary plate 25 when it revolves. The rotary plate 25, which serves as the base for the retention zone 28, defined as an area between the gate and the barrier, and which is discussed infra, is spaced just slightly away from the body, i.e., just enough to permit friction free rotation, with respect to the static body, yet not permitting particulates to escape in the gap between the wall 31 and the surface of the rotary plate 25. The remaining elements seen in this figure will be discussed in relation to the discussion of the stand 27, which holds the apparatus of this invention.

Figure 1:
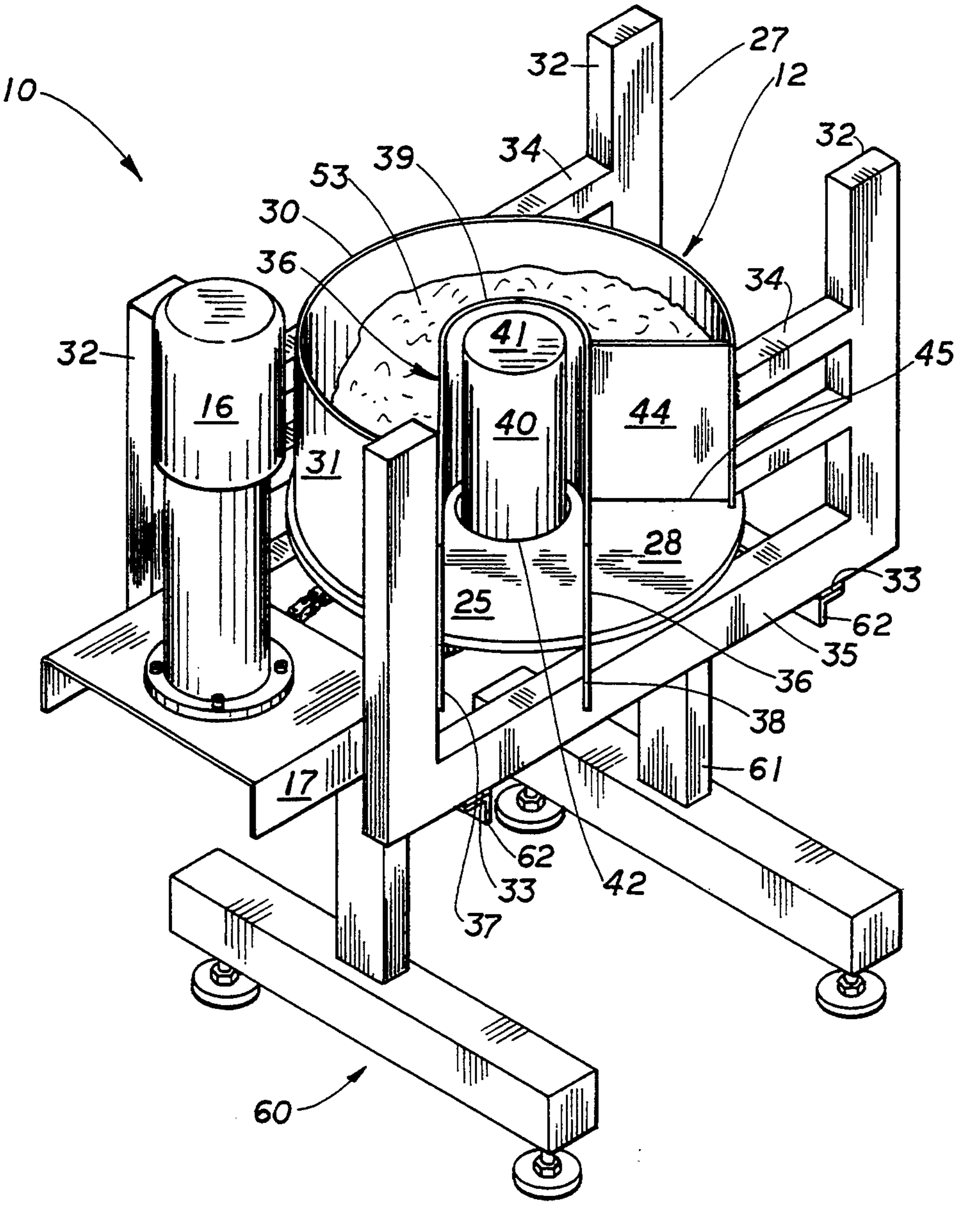
FIG. 1 is a front top perspective view thereof.

The body 14 of the apparatus comprises a wall 31 and a retention zone 28 for particulate matter (see FIG. 1). This storage zone 29, which is open at the top, is formed between and closed off by upstanding curved arcuate portion 30, and its intersection on one end with the left parallel section 37 of an inverted U-shaped portion 36. This first or left parallel section 37 is abuttingly connected to a curved section 39 which in turn is abuttingly connected to a second or right parallel section 38. The curved section 39 and the abutting right parallel section 38 are spaced from said arcuate portion 30. A fixedly secured transversely mounted gate 44 spaced up from the rotary table a finite space 45, is mounted along one side thereof to the other end of arcuate portion 30 and to the inverted U-shaped portion 36 near the junction of second parallel section 38 and curved section 39. See also FIGS. 2, 3 and 4. Gate 44 may be bolted, welded or otherwise secured to its fixed position.

Figure 7:
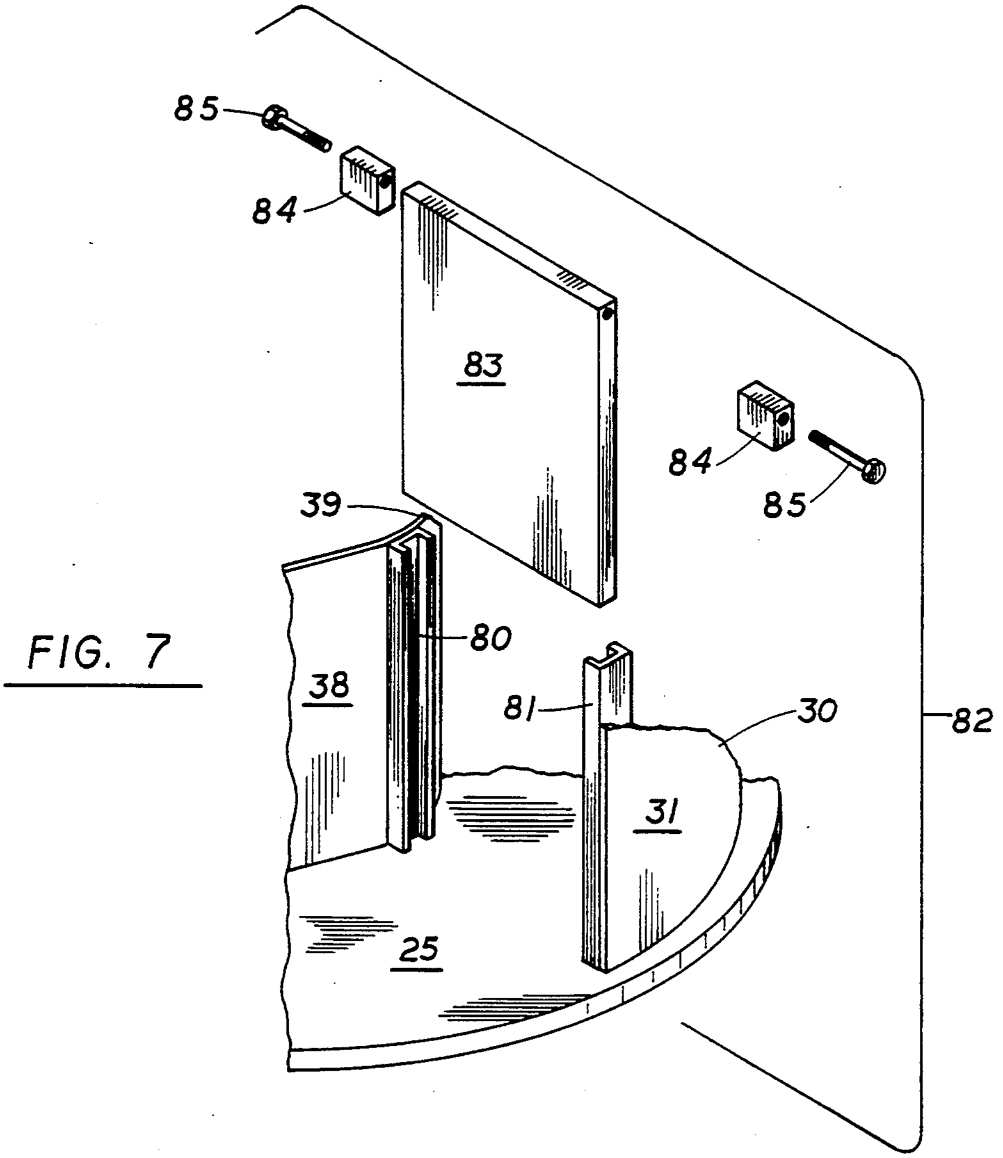
FIG. 7 is an exploded perspective view of a variant of one portion of this invention.
Figure 8:
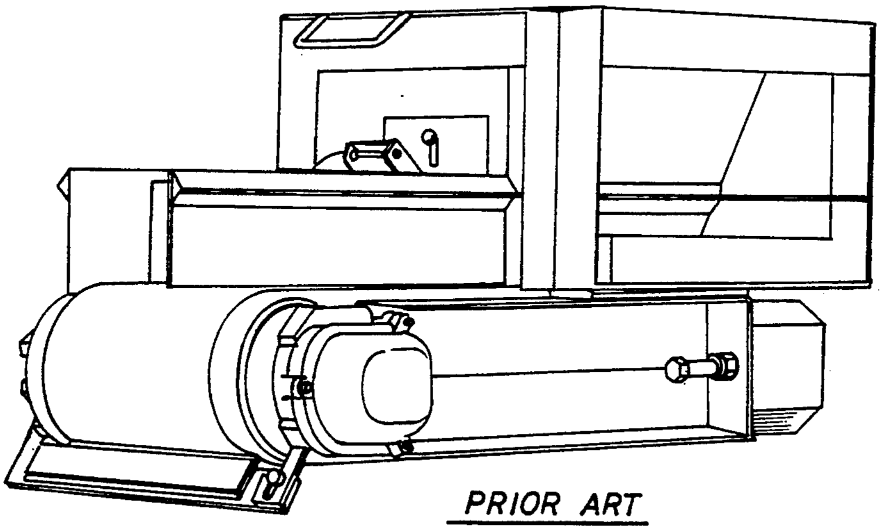
FIG. 8 is a perspective view of a prior art device used to accomplish the same function as the apparatus of this invention.

Rather than utilize a fixed gate 44, as shown in FIG. 1, one may choose to use instead the multipositionable gate 82 as shown in FIG. 7. This gate 82 features a main plate 83 having two pairs of opposed bores, not visible in FIG. 7, near the top edge on both sides of body 83. A pair of bored mated flange blocks 84, are bolted into place by two pairs of bolts 85, into opposed outwardly extending positions along the upper part of the sidewall of said plate 83 using the aforementioned bores for the receipt of the bolts. These flange blocks may vary in elevation from about ½-inch to 2.0 inches or more as may be desired.

Disposed at the free end of arc section 30 is a first upstanding channel 81 sized in width to be slightly greater than the width of main plate 83. (The free end of the arc section is defined as the end not in abutment with parallel wall section 38 of the inverted U-shaped portion 36.) The second opposite channel is designated 80 and is disposed at a suitable location on U-shaped portion 36 in the vicinity of the junction of curved section 39 and parallel section 38 such that it is linearly aligned with channel 81. Thus it is seen that the two channels are disposed such that the slots therein face each other.

By changing flange blocks, 84, 84′ to use ones having different elevations, one may directly vary the height of the opening beneath the gate to thereby control the volume of material that flows therebeneath in any quantum of time, when the gate 82 is disposed within the channels 80, 81.

The reader's attention is now turned again to FIG. 1. Here a cylinder 40 having a cap 41 is seen spaced from the inverted U-shaped portion's walls, but disposed therein adjacent the curved section 39. Cylinder 40 passes through a central opening 42 in rotary table 25 and is secured along its lower circumference to said rotary plate 25 and on its lower edge to the mounting space plate 24, whereby rotation of the mounting plate 24 causes the rotary plate 25 to rotate as well. Mounting plate 24 is connected as by bolts to wheel 21. Cylinder 40 is hollow and receives therein spindle 22. See also FIG. 6 and FIG. 9.

This latter figure shows the connection of sprocket chain 20 to an undermounted sprocket 21 on the underside of mounting space plate 24 and rotary plate 25. A bearing system may be provided for smoother operation.

Of course, the drive mechanism discussed above is merely one of many types of drive systems that can be employed for the rotation of the rotary table (rotating disk) of this invention.

Figure 3:
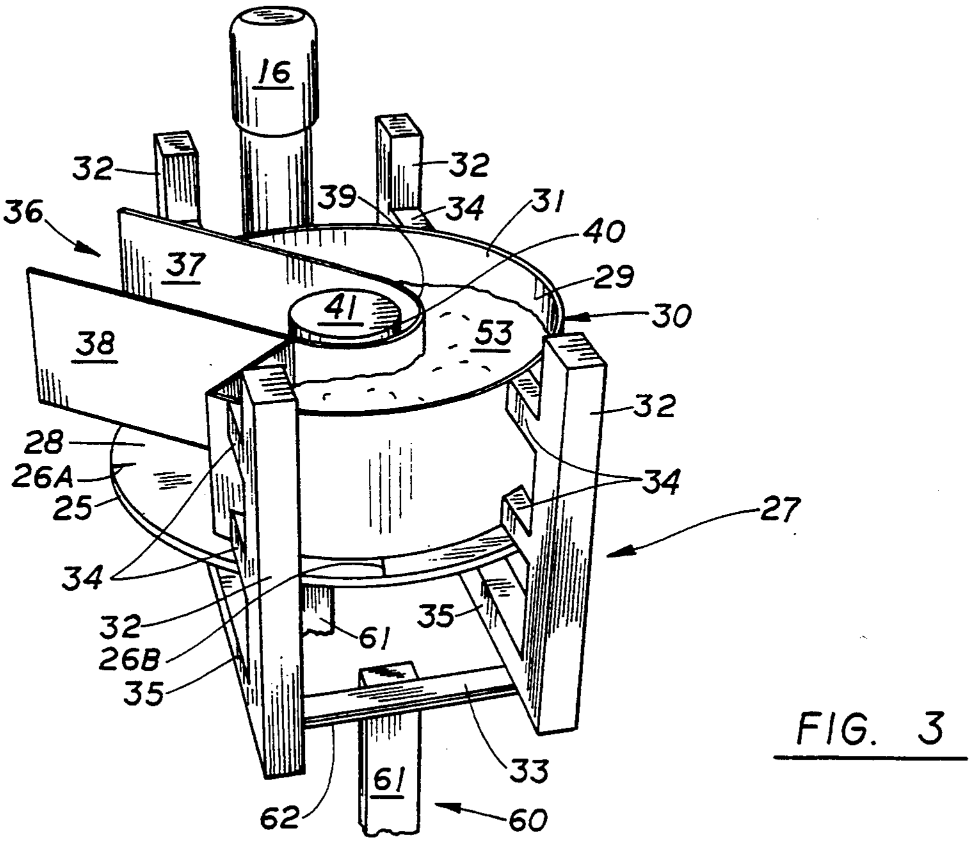
FIG. 3 is a rear perspective view of the apparatus.

The operative aspect of the apparatus of this invention, as noted, rests on a stand 27, which stand may be made portable by disposing it upon a movable base 60, both of which stand and movable base are seen best in FIGS. 3, 4, and 5.

Base 60 includes a pair of spaced upstanding square tubes 61, each of which includes an outwardly extending shelf section 62. The stand 27 rests on or can be welded to or otherwise secured to these two shelves, 62. Base 60 may also be disposed on casters if easy relocation is desired.

Stand 27 includes a pair of spaced parallel horizontal tubular connectors 35—see FIG. 3—each of which is welded or otherwise secured along its bottom surface, normal to one end of each of the two spaced horizontal plates 33. These plates 33, as seen in FIG. 3 rest upon the shelves 62. Upstanding normal to each of these connectors 35 at each of the four ends thereof, is a vertical tubular arm 32. Each of these preferably square tubular arms 32 seen in FIGS. 3, 4, and 5 has an outer face and an inner face. At least one and preferably two horizontal support tubes 34 are welded or otherwise secured in a spaced normal relationship, on one end to the inner face of each vertical arm 32 and on the other end to the wall 31 of the arc portion 30 of the apparatus. Again, reference is made to FIGS. 3, 4, and 5.

Figure 6:
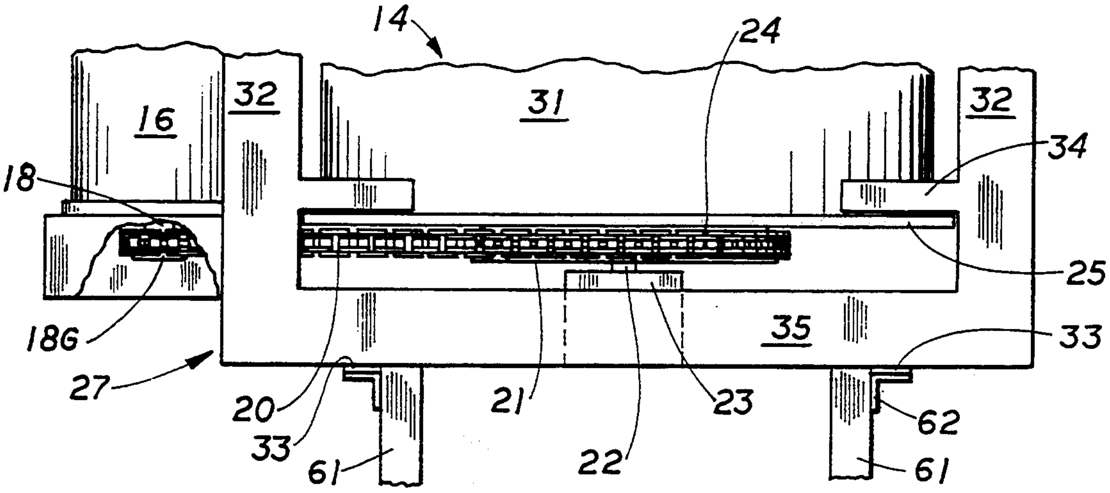
FIG. 6 is a rear close-up view of a portion of this invention.

Apparatus 10 further includes a motor mount 17 to hold a motor 16 such as a 0.5 to 0.75 or greater horsepower electric motor from which extends a standard motor shaft 18, with a tooth gear 18G thereon, for receipt of the chain 20 discussed elsewhere herein in connection with FIG. 6.

OPERATION

The reader is requested to make reference again to FIGS. 1, 2 and 4. In FIG. 2, the hopper 11 for filling the apparatus 10 is seen disposed relatively above the apparatus such that material to be measured 53 may fall by gravity into the storage zone 29 of the apparatus. In FIG. 4 shown adjacent the apparatus next to the gate 44 is a wheel barrow 50 which contains previously measured material 55. Material 53 becomes material 55 only after it has passed beneath the fixed gate 44 or beneath the adjustable gate 82 (see FIG. 7). Most of the material falls off the apparatus, but a finite amount remains, past the gate on a flat area called the retention zone 28.

Material 53 in the holding hopper 11 is delivered to the retention zone 28 by passing from the storage area 29 through gate 44 into the said retention zone 28. By careful positioning of the holding hopper, material 53 can be transferred with little or no loss.

When the plate 25 rotates, dependent upon the height of the opening, a determinable finite amount of material 53 flows beneath the gate 44. The calculation can be made for an apparatus having a fixed or adjustable gate, during every rotation of the rotary plate 25, or for the specific time period of the run of the apparatus. The quantum of flow is also keyed to the rotational speed of the plate. The use of a fixed speed motor 16 simplifies the calculation of volume passage as speed consistency will be obtained for all rotations of the plate 25.

The rotation count or time elapse count to achieve a finite volume measurement is also simplified by reference to the indicia 26A, 26B, (see FIG. 3) et cetera, disposed at uniform spacings along the edge of the rotary plate.

It has been found through development efforts that the residual material 54 left on the rotary table 25 at the retention zone 28 (per FIG. 2) will be approximately the same at the end of each measurement cycle. Therefore since this residual 54 is a constant, it does not effect the amount of the to be measured material 53 converted to actually measured material 55 as collected on the conveyor belt, holding hopper or other vessel such as the wheelbarrow 50.

The formulas to obtain the weight of a particulate product by measuring the volume passing beneath the gate of the apparatus can be readily calculated from a knowledge of the specific gravity of the material in question. Specific weights of common materials are found in the CRC Handbook of Chemistry and Physics among other references.

Figure 10:
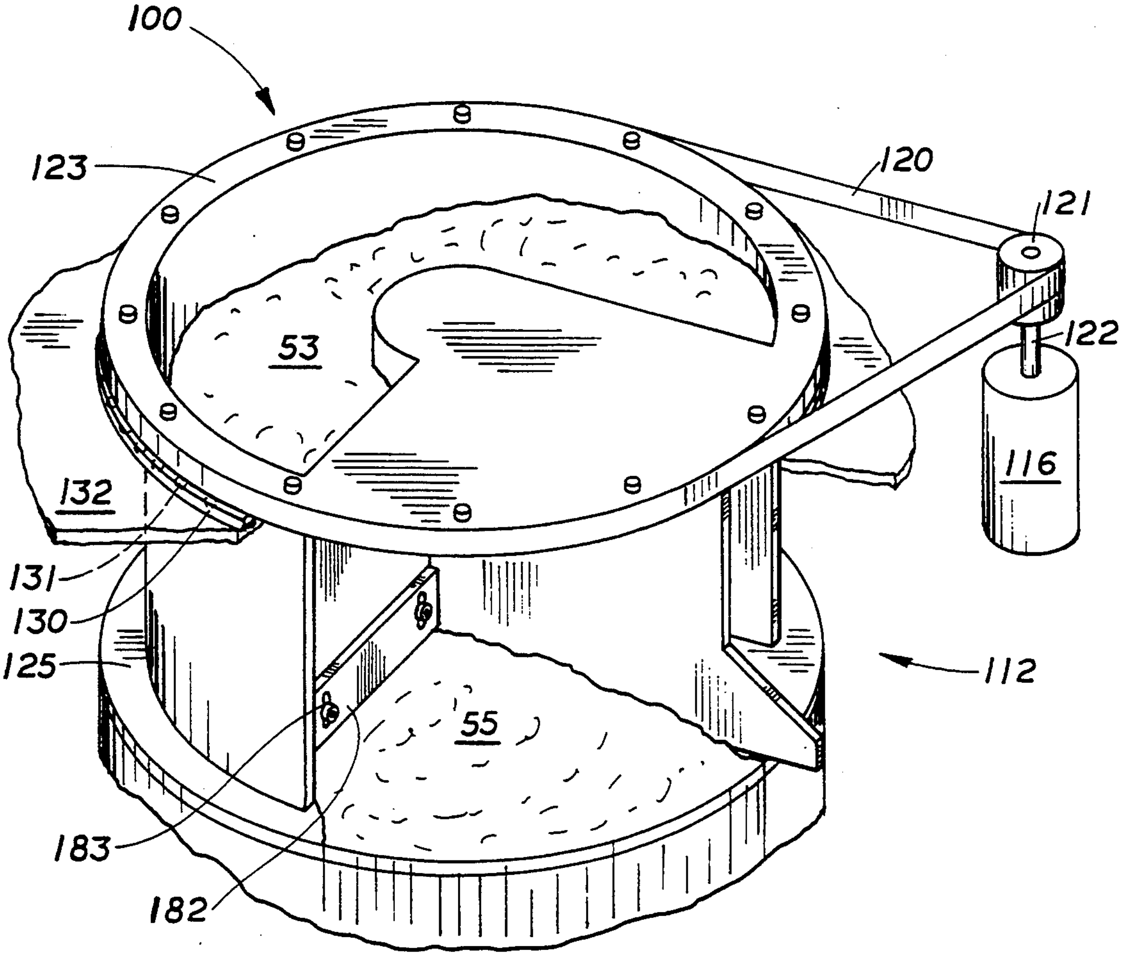
FIG. 10 is a perspective view of a second embodiment of the apparatus of this invention.

Reference is now made to FIG. 10. Whereas in the first embodiment, a rotary plate was employed with a fixed housing, the apparatus of this embodiment operates in reverse to achieve the same results. That is, the base plate is stationary, while the entire housing rotates.

Turning now to FIG. 10, the second embodiment 100 is seen. Here embodiment 100 has a body portion 112 which is substantially similar to the body 12 of the first embodiment. The plate 125 is seen to be stationary while the body 112 rotates. Motor 116 has an upstanding shaft 122 on which is mounted a pulley 121. Disposed on this pulley is belt 120 which is also connected to the body pulley 123 for rotation upon energization of the motor 116. Main body 112 rides on a circular support 130 on a plurality of bearings 131. Circular support 130 is mounted to superstructure 132 to keep the main housing just slightly spaced from the fixed plate 125 to permit smooth rotary movement.

A elevatable gate 182 having moveable detents 183 for height adjustment controls the flow of to be measured material 53. The material that is emitted and measured is designated 55 and is seen outside of the gate 182. An inverted U-shaped barrier 136 is also employed as it was in the first embodiment.

Of course this is only a bare-bones disclosure of a fixed plate rotating body apparatus having a belt drive for rotation, but it serves to illustrate the point that all that is required is for one of the body or plate to move relative to the other to achieve the dry measure by volume apparatus within the scope of this invention.

Figure 9:
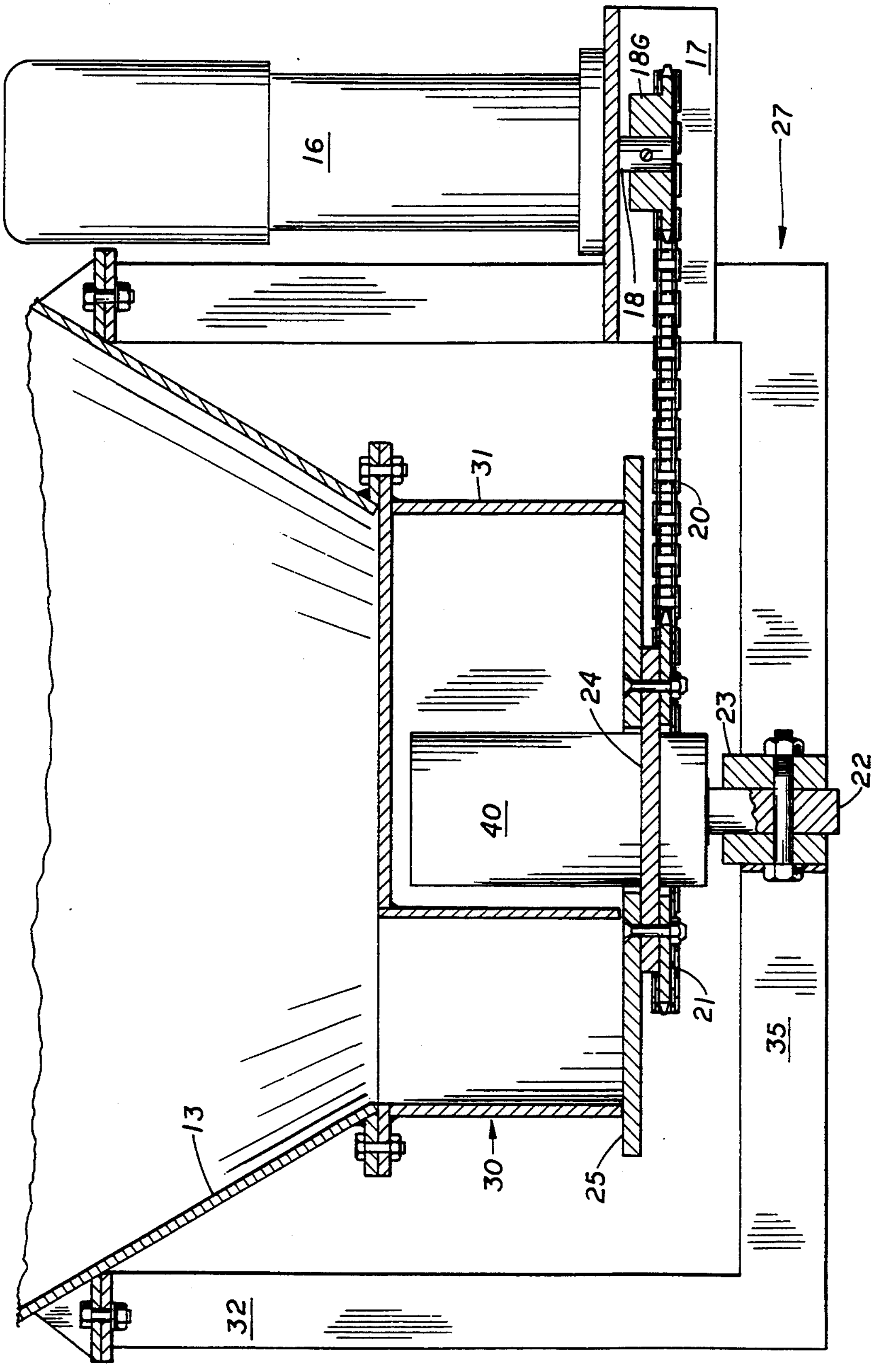
FIG. 9 is a close-up cutaway of a drive mechanism employable in this invention.
Figure 11:
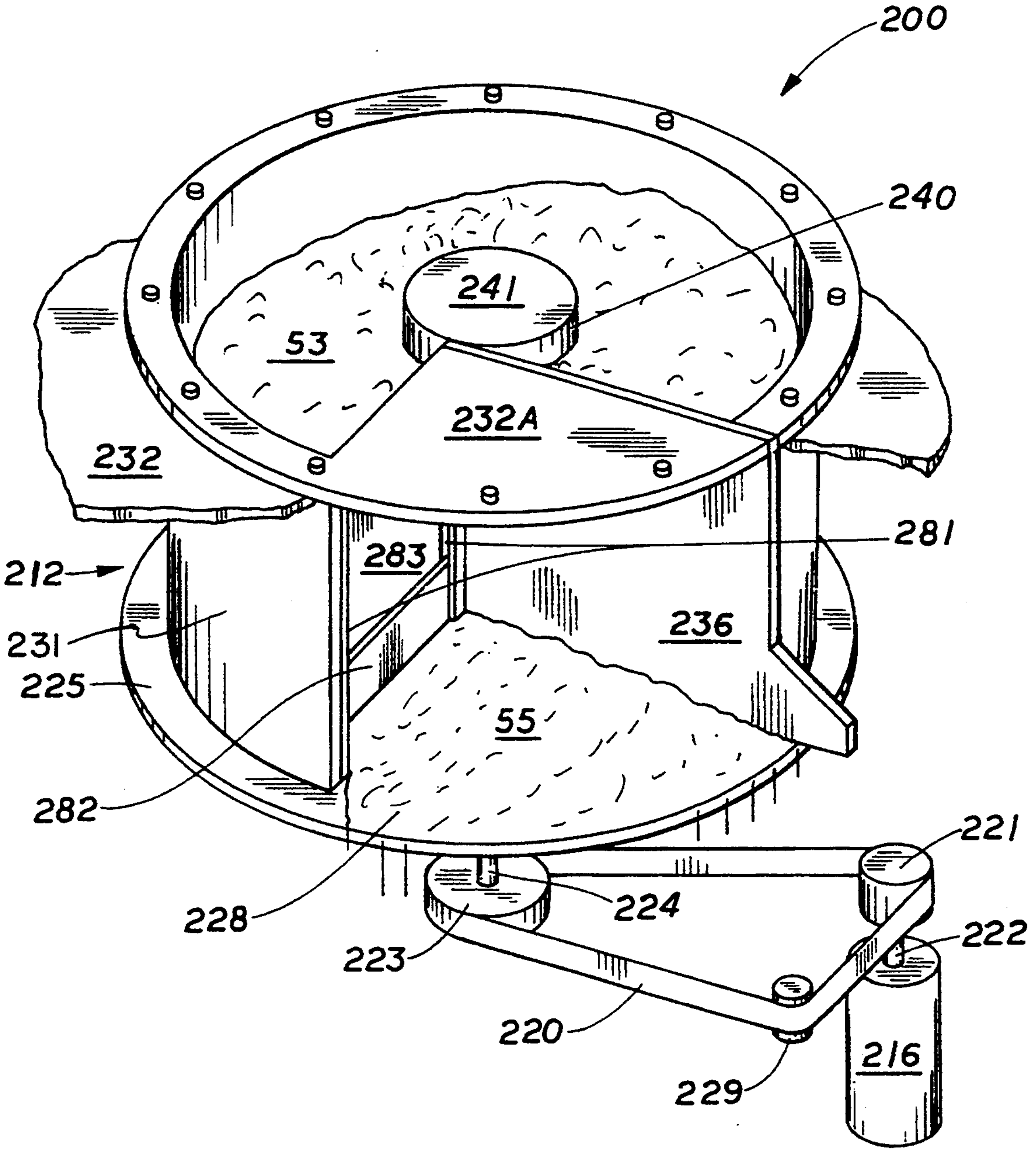
FIG. 11 is a perspective view of a variant of the first embodiment.

Let us now turn to FIG. 11. The apparatus of this figure is configured in part to resemble the second embodiment as seen in FIG. 10 but in operation it works in the manner of the first embodiment as seen in FIGS. 2 and 9, among others. Thus the unit of this figure should be considered to be a variant of the first embodiment in that it too has a fixed body and a rotating disk.

Here instead of an inverted U-shaped barrier 36 as noted in FIG. 3 or the inverted U-shaped barrier 136 of FIG. 10 being employed, a single wall barrier 236 is utilized. The spindle, not seen and other necessary hardware pieces are disposed in the cylindrical drive housing 240 covered by cap 241. These serve the same function as cylinder 40 denoted in FIG. 4, i.e., to keep flying particles out of the drive mechanism.

Here embodiment 200 has a body portion 212 which is similar to the body 12 previously discussed, but for the difference in the barrier. The base plate 225 is seen to be rotary while the body 212 is fixed—the opposite of the unit of FIG. 10. Motor 216 has an upstanding shaft 222 on which is mounted a pulley 221. Disposed on this pulley is belt 220 which is also connected to the body pulley 223, to which is mounted spindle 224 for rotation upon energization of the motor 216. An additional optional bearing pulley 229 as seen here may also be utilized. Upon energization of the motor 216, base plate 225 will rotate as was discussed with respect to element 25.

An outwardly extending annular reinforcing plate 232 is normally disposed from wall 231. This plate also includes a generally triangular section 232A which serves as a cover for retention zone 228 and as a support for barrier 236. Note also the presence of unmeasured material 55 inside the apparatus and residual material 54 disposed just beyond gate 282. Gate 282 rides in detent containing channels 281 in front of fixed plate 283 which in turn is spaced up from rotary plate 225.

Thus the positioning of gate 282 within the channels 281 at a specific elevation determines the amount of material to be measured out as it flows beneath the gate 282.

Other gate configurations in addition to those discussed with respect to this figure, FIG. 1, and FIG. 7 are within the realm of engineering skill.

A support structure for this variant of the first embodiment of the apparatus has not been discussed as one similar to that discussed supra may be employed. Again it is within the skill of the art to design a cradle or other support system both stationary or moveable as on casters for either embodiment of this apparatus.

It is to be recognized that the embodiment depicted in FIG. 2 can be made in a mirror image, and that the apparatuses shown in FIGS. 10 and 11 can also be constructed in their mirror images.

The advantages of the general configuration and operating principles of this volumetric measuring apparatus are several in number. Thus it is seen that because of the forces present between the interaction of the moving rotary plate and the bulk material residing thereon, a certain vibrational movement and compacting action develops. This prevents bridging of materials which sometimes can be a problem with volumetric batching and provides greater accuracy.

It is known from the laws of physics, that the rotational speed of the disk (rotary plate) at various distances from the center is different and the speeds of the resident material is also different at different locations thereupon. This condition causes turbulence and movement (mixing action) which makes the material more homogeneous and has a positive influence of the accuracy of the equipment due to the elimination of air spaces between discrete pieces or particles.

This turbulence in motion will be reinforced at and under the gate due to the addition of the resultant force from the impact of some of the moving material impacting upon the wall of the gate, while other material passes under the gate. The resistance caused by the gate will cause the density of the material flowing through the gate to be further intensified, again contributing to the very high accuracy of this dosage apparatus.

It is seen that I have provided an apparatus for the volumetric measurement of particulate materials for the building block, concrete preparation, and other industries that utilize free flowing particulate matter in their formulations. It is believed that the apparatus could also be adapted for use with semi-wet or nonslump materials such as mixed concrete used in the concrete block and paving stone manufacture industries. An envisioned additional use is the measurement of fine particulate powder materials, such as for the preparation of cake mixes and other related products.

I have moved away from the use of a straight belt running for a particular number of revolutions, or for a period of time, with material falling off the end thereof, to an apparatus which employs a fixed point of impact for moving material, which material is then enabled to flow beneath the fixed impact point or gate. This can be achieved by a rotating base with a fixed body or a fixed base with a rotating body. In either case, the upstanding gate serves as the nonmoving body under which material is free to flow for collection. The gate is spaced upwardly from the surface of the plate a finite distance, usually between one and two inches.

Since certain changes may be made in the described apparatus without departing from the scope of the invention herein involved, it is intended that all matter contained in the above description and shown in the accompanying drawings shall be interpreted as illustrative and not in a limiting sense.

I claim:

1. A volumetric measuring and dispensing apparatus for the dry measure of particulate matter having one of (I) a fixed body and a movable base, and (II) a movable body and a fixed base, which apparatus comprises;

a. a body open at the bottom having a storage zone for particulates to be measured and a retention zone for the receipt and disbursement of particulate matter, which storage zone is defined by an upstanding curved arcuate portion, and its intersection on one end with a inverted U-shaped portion, b. a gate spaced up from the base a finite distance is mounted along one of its two sides to another end of said arcuate portion and on the second of its two sides to the inverted U-shaped portion, and which retention zone is defined as an area on said base outside of said gate and said barrier; and c. said base comprising a plate, one of said plate and said body being connected to a motor which upon energization causes the one of said table and said body to rotate relative to the other of said table and said body, whereby material piled within the storage zone will pass under the gate and out of the body for collection with residual material being retained on the retention zone.

2. In the apparatus of claim 1 wherein the gate is a fixedly secured transversely mounted gate.

3. In the apparatus of claim 1 wherein the base is movable and the body is fixed, and said movable base comprises a rotary plate mounted on a support connected to a means for producing rotation.

4. In the apparatus of claim 1 wherein the gate comprises an adjustable gate comprising a main plate with replaceable flanges thereon, and a pair of spaced opposed channels with the slots therein facing each other, one of which channels is mounted on said arcuate portion and the other of which channels is mounted to said inverted U-shaped portion.

5. In the apparatus of claim 1 wherein of the two elements, the body rotates and the base is fixed.

6. In the apparatus of claim 1 wherein the barrier is the right parallel section of an inverted U-shaped portion having left and right parallel sections abuttingly connected to a curved section therebetween.

7. In the apparatus of claim 1 wherein the gate is multipositionable.

8. In the apparatus of claim 1 wherein said storage zone is defined by an upstanding curved arcuate portion, and its intersection on one end with the right parallel section of an inverted U-shaped portion having left and right parallel sections abuttingly connected to a curved section therebetween which right parallel section serves as barrier;

said curved section and the left parallel section of said inverted U-shaped portion being spaced from said arcuate portion.

9. In the apparatus of claim 1 wherein the inverted U-shaped portion is the left parallel section of an inverted U-shaped portion having left and right parallel sections abuttingly connected to a curved section therebetween.

10. In the apparatus of claim 9 wherein the gate is mounted to the inverted U-shaped portion near the junction of one of the parallel sections and the curved section of said inverted U-shaped portion.

11. In the apparatus of claim 10 wherein the gate is mounted to the inverted. U-shaped portion near the junction of the right parallel section and the curved section.

12. A volumetric measuring and dispensing apparatus for the dry measure of particulate matter having a fixed body and a rotating base, which base rotates with respect to the body, and which apparatus comprises;

a. said body open at the bottom having a storage zone for particulates to be measured and a retention zone for the receipt and disbursement of particulate matter, which storage zone is defined by an upstanding curved arcuate portion, and its intersection on one end with a inverted U-shaped portion, a gate spaced up from the rotatable base a finite distance is mounted along one of its sides to said inverted U-shaped portion; and which retention zone is defined as an area on said base outside of said gate and said inverted U-shaped portion;

said base spaced slightly from said body to permit rotation of one with respect to the other;

said base rotatingly connected to a motor which upon energization causes the connected base to rotate relative to the fixed body whereby material piled within the storage zone will pass under the gate and out of the body for collection.

13. In the apparatus of claim 12, wherein the barrier comprises the right parallel section of an inverted U-shaped portion having left and right parallel sections abuttingly connected to a curved section therebetween;

said curved section and the left parallel section of said inverted U-shaped portion being spaced from said arcuate portion.

14. In the apparatus of claim 12 wherein the barrier comprises the left parallel section of an inverted U-shaped portion having left and right parallel sections abuttingly connected to a curved section therebetween;

said curved section and the right parallel section of said inverted U-shaped portion being spaced from said arcuate portion.

15. In the apparatus of claim 14, wherein the gate is mounted on another of its sides to the end of said arcuate portion distant from said inverted U-shaped portion.

16. A volumetric measuring and dispensing apparatus for the dry measure of particulate matter having one of (I) a fixed body and a movable base, and (II) a movable body and a fixed base, which apparatus comprises;

a. a body open at the bottom having a storage zone for the receipt and disbursement of particulate matter, which storage zone is defined by an upstanding curved arcuate portion, and its intersection on one end with the left parallel section of an inverted U-shaped portion having left and right parallel sections abuttingly connected to a curved section therebetween which left parallel section serves as barrier;

said curved section and the right parallel section of said inverted U-shaped portion being spaced from said arcuate portion;

a gate spaced up from the movable base a finite distance is mounted along one of its sides to another end of said arcuate portion and along another of its sides to the inverted U portion; and b. said base comprising a rotating table connected to a motor which upon energization causes the table to rotate relative to the fixed body whereby material piled within the storage zone will pass under the gate and out of the body for collection.

17. A volumetric measuring and dispensing apparatus for the dry measure of particulate matter having a movable body and a fixed base, which apparatus comprises;

a. said body open at the bottom having a storage zone for the receipt and disbursement of particulate matter, which storage zone is defined by an upstanding curved arcuate portion, and its intersection on one end with the left parallel section of an inverted U-shaped portion having left and right parallel sections abuttingly connected to a curved section therebetween which left parallel section serves as barrier;

said curved section and the right parallel section of said inverted U-shaped portion being spaced from said arcuate portion;

a gate spaced up from the base a finite distance is mounted along one of its two sides to another end of said arcuate portion and on the other of its two sides to the inverted U portion; and b. said body having means interconnected to a motor which upon energization causes the body to rotate relative to the fixed base whereby material piled within the storage zone will pass under the gate and out of the body for collection.

18. A volumetric measuring and dispensing apparatus for the dry measure of particulate matter having a movable body and a fixed base, which apparatus comprises;

a. said body open at the bottom having a storage zone for particulates to be measured and retention zone for the receipt and disbursement of particulate matter, which storage zone is defined by an upstanding curved arcuate portion, and its intersection on one end with a inverted U-shaped portion, b. a gate spaced up from the base a finite distance is mounted along one of its two sides to another end of said arcuate portion and on the second of its two sides to the inverted U-shaped portion, and which retention zone is defined as an area on said base outside of said gate and said inverted U-shaped portion; and c. said base comprising a table spaced slightly from said body to permit rotation of said body, said body being connected to a motor by a pulley system, whereby upon energization of said motor the said body rotates relative to said table, such that material piled within the storage zone will pass under the gate and out of the body for collection with residual material being retained on the retention zone.

19. In the apparatus of claim 18 wherein the inverted U-shaped portion comprises one of the parallel sections of an inverted U-shaped portion having left and right parallel sections abuttingly connected to a curved section therebetween;

said curved section and the other parallel section of said inverted U-shaped portion being spaced from said arcuate portion.

* * * * *